United States Patent [19]

Peterson et al.

[11] 4,020,910

[45] May 3, 1977

[54] SEALING BETWEEN RELATIVELY ROTATING MEMBERS IN BORING APPARATUS

[75] Inventors: Carl R. Peterson, Boxford; Allan T. Fisk, Salem, both of Mass.

[73] Assignee: Rapidex, Inc., Gloucester, Mass.

[22] Filed: May 19, 1976

[21] Appl. No.: 688,042

[52] U.S. Cl. .............................. 175/345; 175/227; 277/165; 277/182

[51] Int. Cl.[2] ...................... E21B 9/22; F16J 15/34

[58] Field of Search .......... 175/339, 345, 346, 347, 175/227, 228; 277/174, 3, 83, 125, 165, 182, 183

[56] References Cited

UNITED STATES PATENTS

| | | | |
|---|---|---|---|
| 2,187,037 | 1/1940 | Kirkpatrick | 175/347 |
| 2,871,037 | 1/1959 | Johnson et al. | 277/182 |
| 3,094,335 | 6/1963 | Shenk | 277/174 |
| 3,384,382 | 4/1968 | Rink | 277/165 |
| 3,718,338 | 2/1973 | Traub | 277/165 |
| 3,851,888 | 12/1974 | Limpson, Jr. et al. | 277/165 |
| 3,947,044 | 3/1976 | Friedrich | 277/3 |
| 3,972,536 | 8/1976 | Warner et al. | 277/83 |

Primary Examiner—James A. Leppink

[57] ABSTRACT

A boring apparatus having a working member mounted for rotation on a lubricated bearing about a shaft member, the apparatus being of the type in which substantial radial and axial relative motion between said members occurs in response to radial and axial loading conditions encountered by the working member during operation in an abrasive laden external environment, including an improved seal assembly between the members for sealing the bearing from the environment while accommodating the radial and axial relative motion, the seal assembly comprising a seal carrier mounted in a space between the members, a dynamic seal element supported between the carrier and one of the members to form a dynamic seal therebetween, and a static seal element supported between the carrier and a radially extending surface of the other of the members, the dynamic seal element being axially slidable along the one member to accommodate the axial relative motion, the static seal element being deformable and radially slidable along the surface to accommodate said radial relative motion.

25 Claims, 4 Drawing Figures

SEALING BETWEEN RELATIVELY ROTATING MEMBERS IN BORING APPARATUS

BACKGROUND OF THE INVENTION

This invention relates to improved seals between relatively rotating members in boring apparatus such as that shown, e.g., in Peterson U.S. Pat. Nos. 3,897,837 and 3,945,447, the disclosures of which are hereby incorporated by reference as background information.

The boring apparatus shown in the Peterson patents employs lubricated bearings for cutters mounted to rotate on internal, non-rotating shafts. Seals are required to retain the lubricant and exclude dirt and abrasive material. Under heavy radial loading (e.g., when enlarging a hole in rock), the cutter shafts (which have high length-to-diameter ratios of about 4:1 or more between supports) deflect elastically. To avoid excessive pressures near the ends of the journal bearings it is necessary to use "soft" bearings which can accommodate the shaft deflection. As a result, there can be considerable radial motion between the cutters and their shafts during operation. Furthermore, normal fabrication tolerances (e.g., 0.010–0.067 inch) inherently permit appreciable relative axial motion between the cutters and their shafts in response to the reversing axial loading experienced during operation. The bearing seals must permit these radial and axial motions (in addition to the basic rotational motion between the cutters and their shafts) while being subjected to an extremely dirty and abrasive environment.

Similar requirements are imposed on other sorts of rotary rock drills, and would also apply to roller stabilizers if used with sealed, lubricated bearings.

The above sealing requirements must be met even though relatively little space is available for seals on these reamers and stabilizers.

SUMMARY OF THE INVENTION

The invention is applicable to various sorts of boring apparatus having a working member mounted for rotation on a lubricated bearing about a shaft member wherein substantial radial and axial relative motion between said members occurs in response to radial and axial loading conditions encountered by the working member during operation. The invention provides a compact, simple, reliable, economical, easily assembled rotary seal capable of tolerating large radial and axial relative motions in an abrasive laden external environment without degradation of seal quality.

In general the invention features, in one aspect, a seal assembly comprising a seal carrier mounted in a space between the working and shaft members, a dynamic seal element supported between the carrier and one of the members to form a dynamic seal therebetween, and a static seal element supported between the carrier and a radially extending surface of the other of the members, the dynamic seal element being axially slidable along the one member to accommodate the axial relative motion, the static seal element being deformable and radially slidable along said surface to accommodate said radial relative motion. In preferred embodiments the radially extending surface is perpendicular to the axis of rotation and is preferably provided by a seal retainer portion of the working member, the retainer portion being an annular member of L-shaped cross-section which is fixed in a counterbore of the working member; the dynamic seal element (preferably a quad ring) is located in a groove of the annular carrier and runs against the shaft, and is sufficiently resistant to radial distortion that substantially all of the radial relative movement between members will be accommodated by relative radial movement between the carrier and the working member; the static seal element (preferably an O-ring) is squeezed between one end of the carrier and the radially extending surface, the other end of the carrier slidingly contacts a second radially extending surface of the working member to maintain the static seal element in its squeezed condition, the second surface being on the side of seal assembly closest to the bearing; and the radially extending surface terminates short of the shaft to provide clearance for accommodation of substantially all of the radial relative movement between the members, and a lip is provided between the static seal and the shaft to prevent extrusion of the static seal into the clearance, the lip preferably being part of the carrier.

In another aspect the invention features a primary seal assembly between the working and shaft members for sealing the bearing from the environment while accommodating the radial and axial relative motion, and a secondary seal assembly adjacent the primary seal assembly, the secondary seal assembly comprising a washer surrounding and slidingly contacting the outer surface of the shaft member and a resilient ring in circumferential contact with an oblique peripheral surface of the washer to bias the washer axially against a surface of the working member. In preferred embodiments there is a second washer adjacent the first mentioned washer, the washers having adjacent chamfered peripheries between which is located the resilient ring to bias the washers apart from each other.

In yet another aspect the invention features a seal assembly comprising an annular retainer of generally U-shaped cross-section providing opposing internal radially extending surfaces, an annular carrier within the retainer, a dynamic seal element located in a radially inwardly opening recess of the carrier, for use as a dynamic seal against the shaft member, and a static seal element squeezed between one of the opposing surfaces and one end of the carrier, thereby biasing the other end of the carrier against the other opposing surface, the static seal element and the other end of the carrier being slidable radially along said opposing surfaces, respectively, to accommodate relative radial motion between the working and shaft members. In preferred embodiments the retainer comprises two portions crimped together.

In yet another aspect the invention features an upper seal assembly between the upper end of the working member and the shaft member for sealing the bearing from the environment while accommodating the radial and axial relative motion, and a lower seal assembly for sealing between the lower end of the working element and the shaft, comprising a thrust bearing, a dynamic seal element located between the thrust bearing and one of the members, and a static seal element located between the thrust bearing and the other of the members, there being an enlarged clearance between the thrust bearing and the other member to accommodate radial relative motion between the bottom of the working member and the shaft. In preferred embodiments the working member is a conically-shaped cutter with its major diameter at its upper end, so that the radial relative motion between the bottom of the cutter and the shaft will generally be less than the radial relative motion between the top of the cutter and the shaft; and static and dynamic seals at the bottom of the working member are spaced axially to allow canting of the thrust bearing relative to the shaft.

Other advantages and features of the invention will be apparent from the description and drawings herein of preferred embodiments thereof.

DESCRIPTION OF PREFERRED EMBODIMENTS

Figure 1:
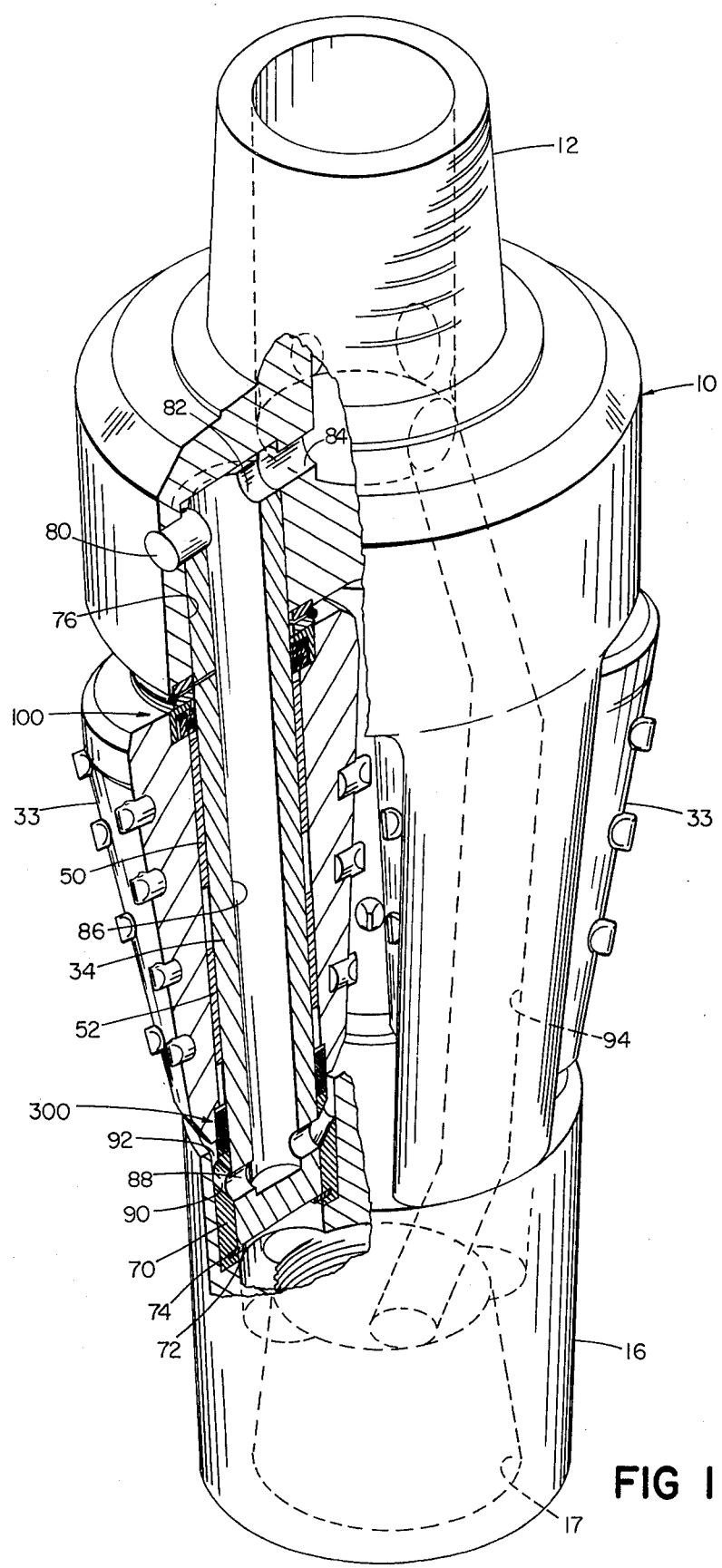
FIG. 1 is a perspective view partly sectioned showing a portion of a drill string embodying the invention.

The drawings show the invention embodied in conical reamer apparatus of the general sort shown in the above-identified Peterson patents.

Frame 10 has threaded connectors 12 and 16 at its top and bottom, respectively. Cutters 33 are mounted to rotate about shafts 34. Bearing inserts 50 and 52 rotate with the cutters on the outer surfaces of the shafts. The lower ends of shafts 34 are received in bushings 70 pressed into the frame and are supported axially by snap rings 72 retained in grooves 74 of the bushings. The upper ends of the shafts are received in bores 76 of the frame. Pins 80 welded in the frame engage notches 82 across the tops of the shafts to prevent shaft rotation.

Cooling and flushing fluid flows axially through connector 12 in the general manner shown in said patents. Part of the fluid flows through frame passages 84, shaft notches 82, and down through the hollow interiors 86 of shafts 34 to cool the cutter bearings, exiting through shaft holes 88 which communicate with bushing holes 90 and annular gaps 92 between the cutters and the frame to form an upwardly directed annular jet that carries rock cuttings upwardly around the cutters. Remaining fluid flows through frame passages 94 to connector passage 17 and on to the next element in the drill string.

Lubricant is introduced through passages 96 (FIG. 2) into the spaces between cutters 33 and shafts 34 adjacent bearing inserts 50 and 52, as described in said patents.

Upper seal assembly, shown generally at 100, is pressed into counterbore 102 in cutters 33 to retain lubricant and exclude dirt at the upper end of each cutter 33. Seal assembly 100 consists of four generally annular parts: retainer 104 of generally L-shaped cross-section (a press fit in bore 102), carrier 106, quad ring 108, and O-ring 110. Quad ring 108 is contained in groove 112 in carrier 106. The dimensions of groove 112 (width and inside diameter) are generally those recommended by the quad ring manufacturer for a dynamic (i.e. rotating) seal between carrier 106 and shaft 34—that is, there is intended to be a rubbing seal between quad ring 108 and the cylindrical surface of shaft 34. A quad ring is shown as the dynamic seal element because it is relatively stiff in the radial direction, hence carrier 106 will ride on quad ring 108, maintaining concentricity with shaft 34. Alternatively, a hard O-ring could be substituted for quad ring 108, or other radially stiff shapes could be used. O-ring 110 is squeezed axially between carrier 106 and the radially extending surface 113 (which can be considered functionally as a surface of cutter 33 and is preferably perpendicular to the axis of rotation) of retainer 104, with a squeeze generally equal to that recommended by O-ring manufacturers for static seals (typically about double the squeeze for a comparable O-ring used as a dynamic seal). This relatively tight squeeze inhibits relative rotation between carrier 106 and surface 113, and although such relative rotation is not positively prevented, very little will occur. Thus, the primary relative rotation seal occurs between quad ring 108 and the surface of shaft 34. Radial clearance between carrier 106 and retainer 104 allows radial motion of cutter 33 and retainer 104 on the one hand and shaft 34 and (concentric) carrier 106 on the other, in an amount ample to accommodate substantially all of the expected radial relative motion between the cutter and its shaft. This relative motion is accompanied by distortion and slight sliding along surface 113 of essential static O-ring seal 110, and slight sliding of carrier 106 on surface 103 of cutter 33. Note that the interface between carrier 106 and surface 103 is on the "clean" and lubricated side of the seal assembly and hence not likely to result in resistance or wear. Relatively large radial clearance is provided between retainer 104 and shaft 34 at 107 to avoid contact between the two, and lip 105 is provided on carrier 106 to prevent O-ring 110 from extruding through this clearance.

The cylindrical shape of shaft 34 permits large axial motion of quad ring 108 along the shaft.

Upper thrust washers 130 and 132 are placed between cutter 33 and frame surface 134. O-ring 136 is stretched around washers 130 and 132 and carried in a groove formed by opposite chambers 138 and 140. Hoop tension in O-ring 136 forces the latter into this groove, opening a gap 142 between the washers which are respectively forced against cutter 33 and surface 134. This arrangement acts as a secondary seal between the relatively rotating members and assists in keeping dirt away from seal assembly 100. In some applications it is desirable to bleed a small quantity of flushing fluid through small passage 144 to the space beneath washers 130 and 132, thus purging dirt away from gap 142 and seal assembly 100.

Figure 2:
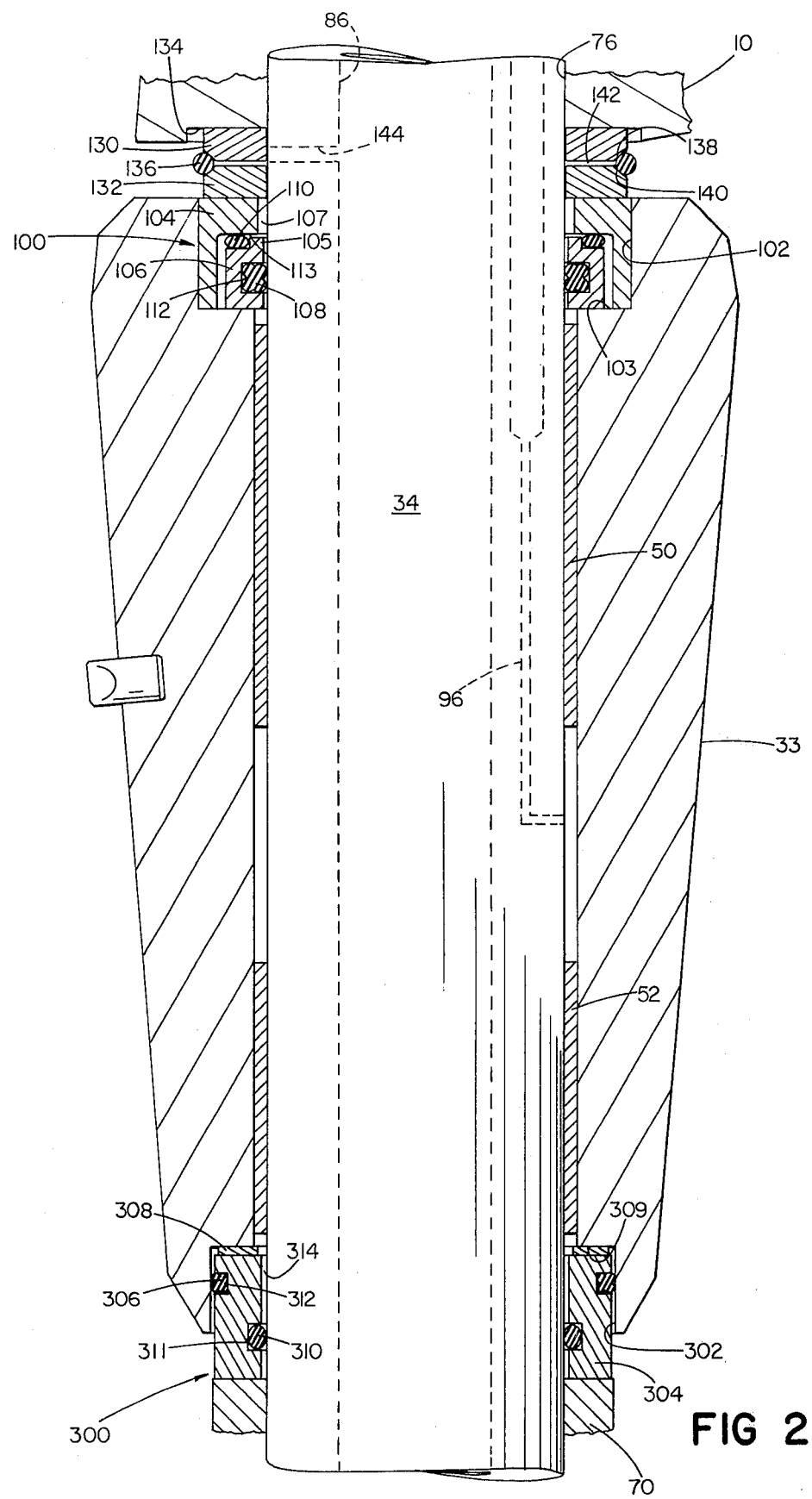
FIG. 2 is an enlarged sectional view of a portion of FIG. 1 showing the invention in greater detail.
Figure 3:
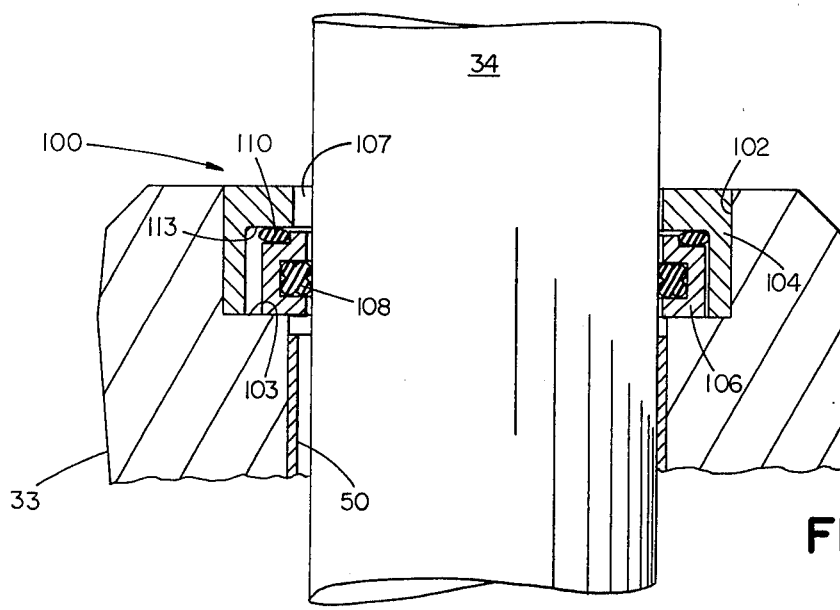
FIG. 3 shows a fragment of FIG. 2 with the cutter and shaft in a non-concentric relationship.

FIG. 2 illustrates the seal assembly when cutter 33 is concentric with shaft 34. FIG. 3 illustrates an extremely con-concentric situation, in this case arising from bearing wear causing play between bearing 50 and shaft 34.

Figure 4:
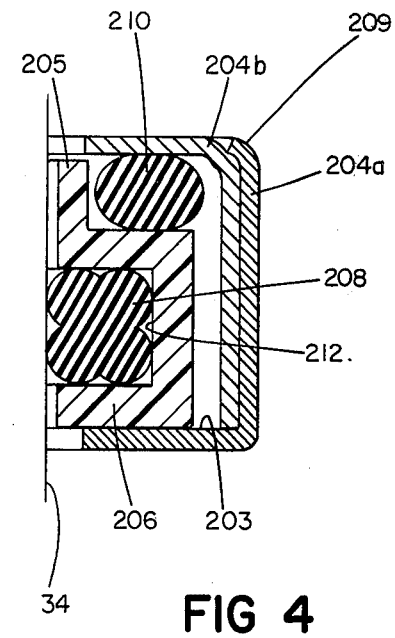
FIG. 4 is a sectional view of an integral seal construction embodying the invention.

FIG. 4 illustrates an integral seal construction which can be assembled prior to pressing into place for service. In this form the seal could be marketed as a separate item for general use. The 200 numbers of FIG. 4 correspond generally to the same 100 part numbers of FIG. 2. In the integral seal the retainer (of generally U-shaped cross-section) consists of two pieces, 204a and 204b, pressed together at assembly and crimped at 209. All internal parts, particularly the carrier 206 and O-ring 210, would be in place when the retainer pieces are crimped together. Internal surface 203 now acts as the surface against which carrier 206 rubs. Carrier 206 could be cast of suitable tough plastic material.

A lower seal and thrust bearing assembly is shown generally at 300. Because the major radial loads are encountered at the upper portions of the conical cutters, less radial cutter motion relative to the shaft needs to be accommodated at the lower end of the cutter than at the upper end. Lower thrust bearing 304 is inserted rotatably in the counterbore 302 in the lower end of cutter 33 and is supported axially by bushing 70. Quad ring seal 306 is carried in groove 312 in bearing 304 and seals rotatably against bore 302. The dimensions of groove 312 are generally those recommended for a dynamic seal. A lower thrust washer 308, of typical bearing material such as bronze, is placed between the end of bearing 304 and surface 309 of cutter 33. O-ring 310 is carried in groove 311 to seal against shaft 34. The radial squeeze of the O-ring is typically that recommended for static seals, and this tight squeeze inhibits relative rotation between shaft 34 and lower thrust bearing 304. Relatively large gap 314 between lower thrust bearing 304 and shaft 34 allows radial motion of the former to follow radial motion of cutter 33, thus avoiding large radial displacements between cutter 33 and quad ring 306. The O-ring and quad ring are space apart axially to permit slight canting of the thrust bearing upon occurrence of the radial motion of the cutter.

Other embodiments are within the following claims.

We claim:

1. In boring apparatus having a working member mounted for rotation on a lubricated bearing about a shaft member, said apparatus being of the type in which substantial radial and axial relative motion between said members occurs in response to radial and axial loading conditions encountered by said working member during operation in an abrasive laden external environment, that improvement comprising a seal assembly between said members for sealing said bearing from said environment while accommodating said radial and axial relative motion, said seal assembly comprising
 a seal carrier mounted in a space between said members,
 a dynamic seal element supported between said carrier and one of said members to form a dynamic seal therebetween, and
 a static seal element supported between said carrier and a radially extending surface of the other of said members,
  said dynamic seal element being axially slidable along said one member to accommodate said axial relative motion,
 said static seal element being deformable and radially slidable along said surface to accommodate said radial relative motion.

2. The improvement of claim 1 wherein said surface is perpendicular to the axis of said rotation.

3. The improvement of claim 1 wherein said dynamic seal element is supported between said carrier and said shaft member.

4. The improvement of claim 3 wherein said static seal element is squeezed between one end of said carrier and said surface, and the other end of said carrier slidingly contacts a second radially extending surface of said working member to maintain said static seal element in its squeezed condition, said second surface being on the side of said seal assembly closest to said bearing.

5. The improvement of claim 4 wherein at least the first mentioned of said radially extending surfaces is provided by a seal retainer portion of said working member, said retainer portion being fixed to the main portion of said working member.

6. The improvement of claim 5 wherein said seal assembly is located in a counterbore of said working member, and said retainer portion is an annular member of L-shaped cross-section which is fixed in said counterbore.

7. The improvement of claim 3 wherein said carrier is an annular member having a groove facing said shaft member, and said dynamic seal element is in said groove.

8. The improvement of claim 1 wherein said dynamic seal element is sufficiently resistant to radial distortion so that substantially all of said radial relative movement between said members will be accommodated by relative radial movement between said carrier and said one member.

9. The improvement of claim 3 wherein said surface terminates short of said shaft to provide clearance for accommodation of substantially all of said radial relative movement between said members, and a lip is provided between said static seal and said shaft to prevent extrusion of said static seal into said clearance.

10. The improvement of claim 9 wherein said lip is part of said carrier.

11. The improvement of claim 1 wherein said dynamic seal element is a quad ring and said static seal is an O-ring.

12. The improvement of claim 1 wherein said seal assembly is at the upper end of said working element, and there is provided at the lower end of said working element a thrust bearing, a dynamic seal element located between said thrust bearing and one of said members, and a static seal element located between said thrust bearing and the other of said members, there being an enlarged clearance between said thrust bearing and said other member to accommodate radial relative motion between the bottom of said working member and said shaft.

13. The improvement of claim 12 wherein said working member is a conically shaped cutter with its major diameter at its upper end, so that said radial relative motion between the bottom of said cutter and said shaft will generally be less than said radial relative motion between the top of said cutter and said shaft.

14. The improvement of claim 12 wherein said static and dynamic seals at the bottom of said working member are spaced axially to allow canting of said thrust bearing relative to said shaft.

15. The improvement of claim 1 further comprising a secondary seal assembly comprising a washer surrounding and slidingly contacting the outer surface of said shaft member, and a resilient ring in circumferential contact with an oblique peripheral surface of said washer to bias said washer axially against a surface of said working member.

16. The improvement of claim 15 further comprising a second washer adjacent said first mentioned washer, said washers having adjacent chamfered peripheries between which is located said resilient ring to bias said washers apart from each other.

17. In boring apparatus having a working member mounted for rotation on a lubricated bearing about a shaft member, said apparatus being of the type in which substantial radial and axial relative motion between said members occurs in response to radial and axial loading conditions encountered by said working member during operation in an abrasive laden external environment, that improvement comprising
 a primary seal assembly between said members for sealing said bearing from said environment while accommodating said radial and axial relative motion, and a secondary seal assembly adjacent said primary seal assembly, said secondary seal assembly comprising a washer surrounding and slidingly contacting the outer surface of said shaft member and a resilient ring in circumferential contact with an oblique peripheral surface of said washer to bias said washer axially against a surface of said working member.

18. The improvement of claim 17 further comprising a second washer adjacent said first mentioned washer, said washers having adjacent chamfered peripheries between which is located said resilient ring to bias said washers apart from each other.

19. A seal assembly for use in sealing between relatively rotating working and shaft members in boring apparatus, comprising
an annular retainer of generally U-shaped cross-section providing opposing internal radially extending surfaces,
an annular carrier within said retainer
a dynamic seal element located in a radially inwardly opening recess of said carrier, for use as a dynamic seal against said shaft member, and
a static seal element squeezed between one of said opposing surfaces and one end of said carrier, thereby biasing the other end of said carrier against the other said opposing surface, said static seal element and said other end of said carrier being slidable radially along said opposing surfaces, respectively, to accommodate relative radial motion between said working and shaft members.

20. The seal assembly of claim 19 wherein said assembly has a lip positioned radially inwardly of said static seal member to prevent said static seal member from being extruded out of said retainer.

21. The improvement of claim 20 wherein said lip is part of said carrier.

22. The seal assembly of claim 19 wherein said retainer comprises two portions crimped together.

23. In boring apparatus having a working member mounted for rotation on a lubricated bearing about a shaft member, said apparatus being of the type in which substantial radial and axial relative motion between said members occurs in response to radial and axial loading conditions encountered by said working member during operation in an abrasive laden external environment, that improvement comprising
an upper seal assembly between the upper end of said working member and said shaft member for sealing said bearing from said environment while accommodating said radial and axial relative motion, and
a lower seal assembly for sealing between the lower end of said working element and said shaft, comprising
a thrust bearing,
a dynamic seal element located between said thrust bearing and one of said members, and
a static seal element located between said thrust bearing and the other of said members,
there being an enlarged clearance between said thrust bearing and said other member to accommodate radial relative motion between the bottom of said working member and said shaft.

24. The improvement of claim 23 wherein said working member is a conically shaped cutter with its major diameter at its upper end, so that said radial relative motion between the bottom of said cutter and said shaft will generally be less than said radial relative motion between the top of said cutter and said shaft.

25. The improvement of claim 23 wherein said static and dynamic seals at the bottom of said working member are spaced axially to allow canting of said thrust bearing relative to said shaft.

* * * * *